J. J. SERRELL.
FLEXIBLE COUPLING FOR SHAFTS.
APPLICATION FILED OCT. 21, 1918.
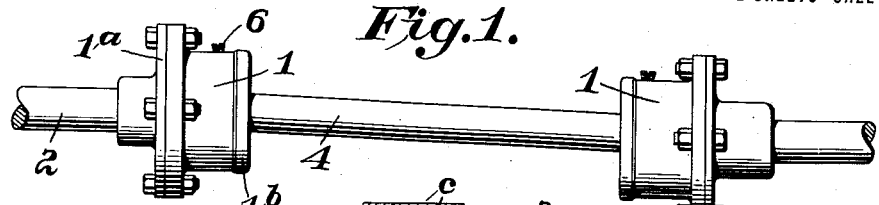
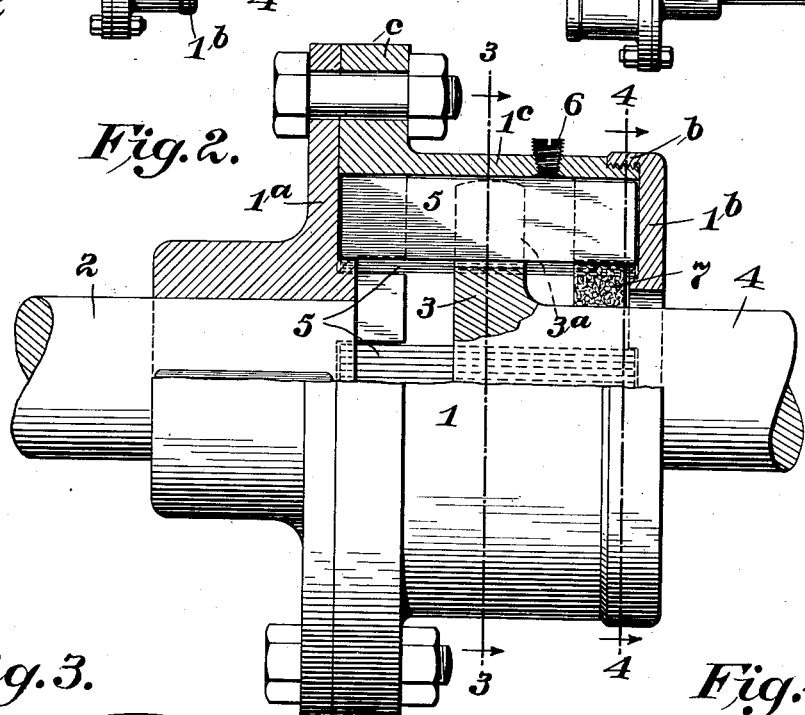
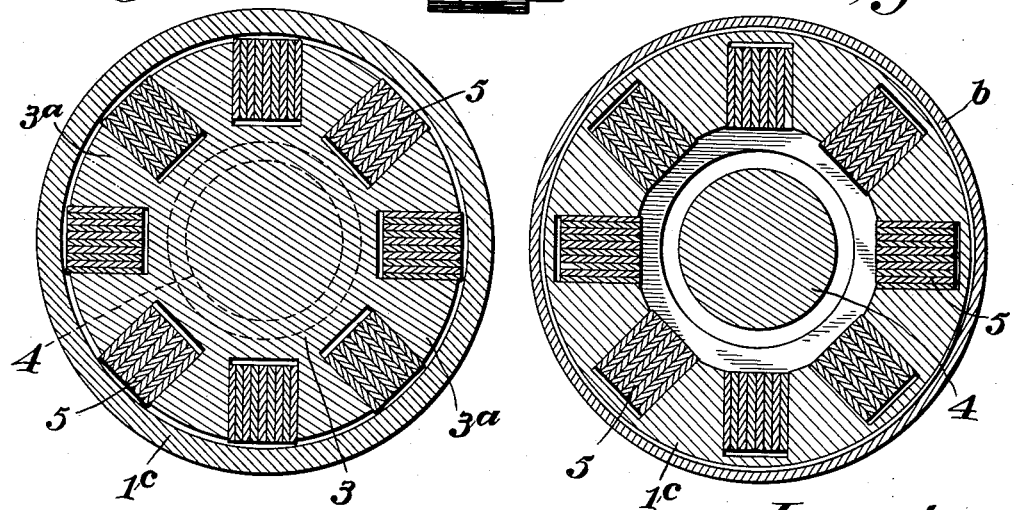
Inventor:
John J. Serrell,
by Shear Middleton Donaldson &c.
Attys.

J. J. SERRELL.
FLEXIBLE COUPLING FOR SHAFTS.
APPLICATION FILED OCT. 21, 1918.

1,324,523.

Patented Dec. 9, 1919.
2 SHEETS—SHEET 2.

Inventor:
John J. Serrell,
by Spear Middleton Donaldson ffear
Atty's.

UNITED STATES PATENT OFFICE.

JOHN J. SERRELL, OF ELIZABETH, NEW JERSEY.

FLEXIBLE COUPLING FOR SHAFTS.

1,324,523.   Specification of Letters Patent.   Patented Dec. 9, 1919.

Application filed October 21, 1918. Serial No. 258,973.

*To all whom it may concern:*

Be it known that I, JOHN J. SERRELL, a citizen of the United States, and resident of Elizabeth, New Jersey, have invented certain new and useful Improvements in Flexible Couplings for Shafts, of which the following is a specification.

My present invention relates to flexible couplings for shafts, and is designed as an improvement upon the type of coupling embodying two heads carried by the adjacent ends of the shafts, and provided with recesses, which receive respectively the opposite ends of leaf springs radially arranged about the axis of the shafts and in which the power is applied to one end of the springs and delivered by the other ends.

Among the objects of the invention are to provide for maximum strength and deflection with a minimum sized coupling, and to make the most effective provision for accommodating the various movements necessary in such a coupling.

With these, and other objects which will hereinafter appear, in view, my invention includes the novel features of construction and arrangement and combination of parts hereinafter described, my said invention being defined by the appended claims.

Several embodiments of my invention are illustrated in the accompanying drawings, in which, Figure 1 is a side elevation of a pair of my improved couplings connecting three shafts.

Fig. 2 is a sectional elevation of one of the couplings on a larger scale.

Fig. 3 is a section on line 3—3 of Fig. 2.

Fig. 4 is a section on line 4—4 of Fig. 2.

Figure 5:
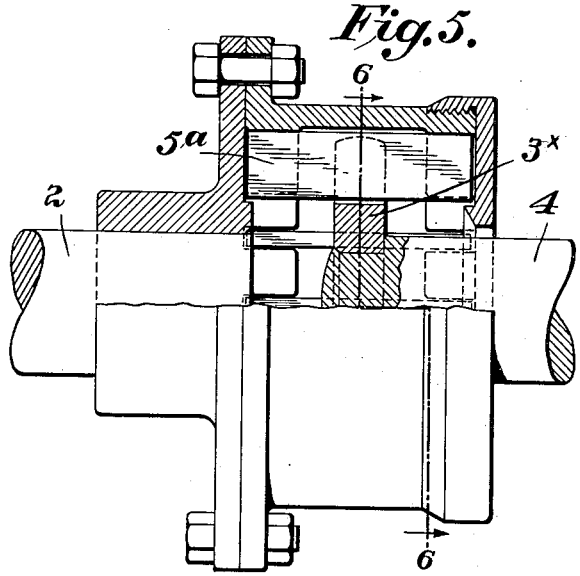
Fig. 5 is a sectional elevation of a modified form.

Referring by reference characters to these drawings the numeral 1 designates one of the coupling heads which is secured to a shaft 2 and is designed to coact with the other coupling head 3 carried by the adjacent and substantially coaxial shaft 4.

The coupling head 1 comprises a ring or flange $1^a$ designed to be secured in any suitable manner to the shaft 2, a second ring $1^b$ spaced therefrom, and having a central opening for the passage of the shaft 4, and a detachable coupling sleeve $1^c$.

Within the housing thus formed are located a plurality of annularly disposed leaf springs 5, arranged in planes radial to the axis of the shafts, or parallel with the radii thereof, the springs being preferably arranged in bundles, as shown in Figs. 2, 3 and 4.

The opposite ends of the springs are confined, or firmly held in recesses in the housing, leaving thus intermediate portions free, and the head 3 carries a plurality of projections $3^a$. In the form now being described the head 3 is shown as an integral part of the shaft, and the projections as integral therewith and rigid or non-yielding the yielding or resilient action being secured by the projections bearing against the intermediate portions of the springs with which they are in sliding contact.

In this form I show the recesses for both ends of the springs as formed in the detachable coupling sleeve $1^c$. The coupling sleeve $1^c$ may be conveniently secured to the ring $1^b$ by screw threads, as shown, said ring being provided with an annular flange $b$ and with an annular countersink. The opposite end of the sleeve may be provided with an annular flange $c$ secured to the ring $1^a$ by bolts as shown. The space within the housing formed by the rings and sleeve may be filled with lubricant which can be inserted through an oil opening closed by plug 6, and escape of the lubricant through the space between shaft 4 and ring $1^b$ may be prevented by a suitable packing ring indicated at 7.

Figure 6:
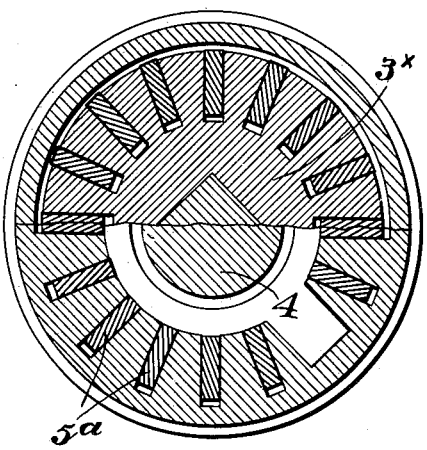
Fig. 6 is a section on line 6—6 of Fig. 5.

In the form shown in Figs. 5 and 6 I have shown how single leaf springs $5^a$ may be used, instead of bundles of springs, and also how the head on shaft 4 may be made as an independent member $3^x$ and suitably secured to the shaft end.

Figure 7:
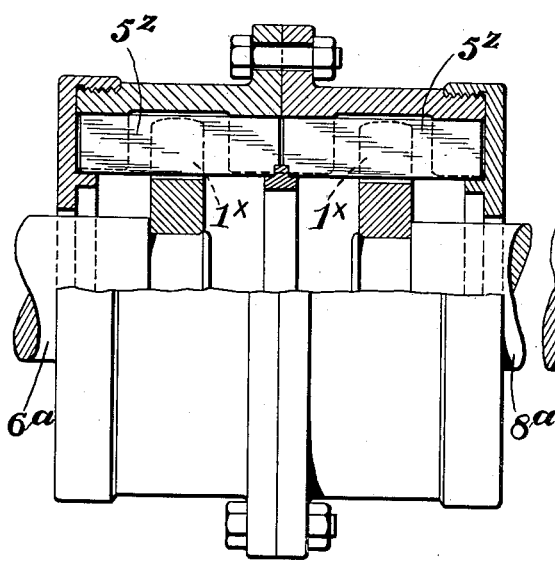
Fig. 7 is a sectional elevation of a coupling similar to Fig. 1, but employing two sets of springs.

In Fig. 7 I have shown how my invention may be embodied in a double coupling, by providing each shaft $6^a$ and $8^a$ with heads carrying projections $1^x$ to engage the two sets of leaf springs $5^z$ carried by the double casing. Such a double coupling will take the place of two reversely placed couplings, as shown in Fig. 1.

Figure 8:
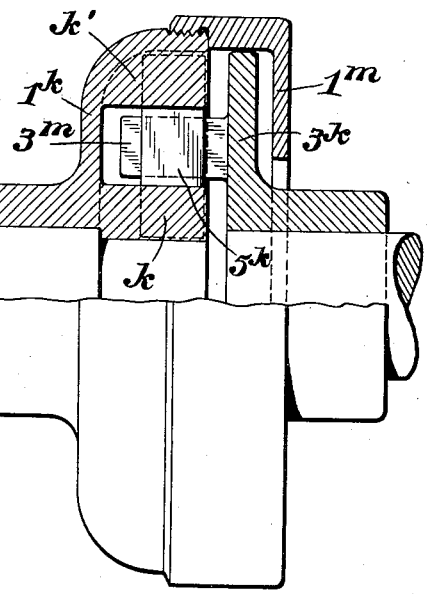
Fig. 8 is a sectional elevation of a still further modification.

In Fig. 8 I have shown how the leaf springs may be arranged lengthwise radially of the axis of the head by providing the head 1 with annular spaced flanges $k$, $k'$ slotted, or grooved, to receive and hold the inner and outer ends of the leaf springs $5^k$ and the head $3^k$ in the shape of a disk having projections $3^m$ coacting with the leaf springs the head $1^k$ having a removable flange or cover $1^m$ to inclose head $3^k$ and complete the housing.

With my arrangement as above described and using springs held at both ends in one flange lengthwise with the connected shafts, the coupling has to be only large enough to provide for the maximum deflection which will occur when the load is applied at the middle of the beam. As the spacing between flanges becomes greater or less the load will be applied nearer to one end or the other end of the beam, and the nearer it is applied to the end of the beam—the stronger the beam or coupling will be. My arrangement therefor provides for a much greater amount of endwise movement with less size.

With my arrangement and using springs held at both ends in one flange and radial to the connected shafts, the coupling has to be only large enough to provide for the maximum deflection which will occur when the load is applied at the middle of the beam. A change in the spacing will not affect the deflection or torque carrying capacity as long as the same relative distance from ends of the beam is maintained. However, if the member which contacts with the middle portion of the beam is made wedge shaped, with a change in the lateral spacing the load may be applied nearer to one or both ends of the beam and therefore the coupling may be made stronger (less flexible) or weaker (more flexible) depending upon the spacing and the relative distance or distances between the edges of the wedge and the ends of the beam.

My improved coupling will take care of (a) endwise movement by the sliding of the projections on the leaf springs in a lateral direction; (b) angular movement by this same lateral movement on some of the springs and by a slight bending of other of the springs; and (c) sidewise or parallel movement by some of the projections sliding in a radial direction on the corresponding leaf springs and by a deflection of the springs. A combination of two such couplings connected by an intermediate shaft as in Fig. 1 will provide for greater endwise motion, greater angular motion, and greater parallel or sidewise motion of the shafts.

Keepers or wearing pieces held in one flange may be used at the ends of the springs to prevent wear between the springs and the two contact surfaces of the one flange, and keepers may also be used between the middle portion of the springs and the other flange. These keepers would serve to take up any wear easily and make it unnecessary to renew the flanges due to wear.

While lubrication of parts which move relative to each other under pressure is not essential with the particular designs shown on my inclosed drawings, it is desirable and can easily be provided for as the external flange containing the springs held at both ends may easily be made so that it can contain grease or oil, especially if a canvas or leather boot or an inclosing case with felt or similar washer is used to hold the lubrication in and keep the dirt out.

What I claim is:

1. A shaft coupling comprising two coupling heads, and a plurality of springs having their ends carried by one head and their intermediate portions contacting with parts carried by the other head, said springs being arranged lengthwise of the axis of the heads and being disposed radially around the same.

2. A shaft coupling comprising a pair of coupling heads, one of said heads comprising a flange, a cylindrical connecting member having two sets of internally formed recesses, bundles of springs disposed lengthwise of the axis of the head and having their opposite ends seated in said recesses, and projections carried by the other head and lying between said bundles of springs.

3. A shaft coupling comprising a pair of coupling heads, one of said heads comprising a pair of rings or flanges, a cylindrical member detachably connecting said flanges, said member having at opposite ends radially disposed grooves or recesses, radially arranged springs having their ends held in said recesses, the other head lying between said rings or flanges, said head having contact parts engaging intermediate portions of said springs.

In testimony whereof I affix my signature.

JOHN J. SERRELL.